(12) United States Patent
Zemenchik

(10) Patent No.: US 10,806,074 B2
(45) Date of Patent: Oct. 20, 2020

(54) SYSTEM FOR TREATMENT OF AN AGRICULTURAL FIELD USING AN AUGMENTED REALITY VISUALIZATION

(71) Applicant: CNH Industrial America LLC, New Holland, PA (US)

(72) Inventor: Robert A. Zemenchik, Kenosha, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/148,142

(22) Filed: Oct. 1, 2018

(65) Prior Publication Data

US 2019/0141883 A1  May 16, 2019

Related U.S. Application Data

(60) Provisional application No. 62/585,349, filed on Nov. 13, 2017.

(51) Int. Cl.
| | |
|---|---|
| *A01C 23/00* | (2006.01) |
| *A01C 23/04* | (2006.01) |
| *A01M 7/00* | (2006.01) |
| *B05B 1/20* | (2006.01) |
| *B60R 1/00* | (2006.01) |
| *A01C 21/00* | (2006.01) |
| *B05B 12/12* | (2006.01) |

(52) U.S. Cl.
CPC .......... *A01C 23/007* (2013.01); *A01C 21/005* (2013.01); *A01C 23/047* (2013.01); *A01M 7/0042* (2013.01); *A01M 7/0089* (2013.01); *B05B 1/20* (2013.01); *B60R 1/00* (2013.01); *B05B 12/122* (2013.01); *B60R 2300/303* (2013.01)

(58) Field of Classification Search
None
See application file for complete search history.

(56) References Cited

U.S. PATENT DOCUMENTS 5,751,576 A * 5/1998 Monson ............... A01B 79/005
  239/161
6,671,582 B1   12/2003 Hanley
  (Continued)

FOREIGN PATENT DOCUMENTS

WO    WO2016145081    9/2016

*Primary Examiner* — YuJang Tswei
(74) *Attorney, Agent, or Firm* — Rebecca L. Henkel; Rickard K. DeMille

(57) ABSTRACT

The invention provides a system that provides simple and efficient automated evaluation of plant stands that opens up tremendous potential in terms of removal, fertilization, protection, and individual plant yield estimation. The system provides automated evaluation of size and placement of plants and may be incorporated into or mounted on a post-emergent vehicle such as a spray boom as a tool that greatly benefits farmers. A farmer could detect, measure, visualize, count, characterize, calculate, estimate, assess, track, and optimize the stand throughout the growing season and even through harvest. An augmented reality visualization of the plant stands can be compared to a prescription map to allow an operator of an implement to select changes in treatment of the field as the implement traverses the field.

20 Claims, 3 Drawing Sheets

(56) References Cited

U.S. PATENT DOCUMENTS

| | | |
|---|---|---|
| 7,792,622 B2 | 9/2010 | Wei et al. |
| 9,265,187 B2* | 2/2016 | Cavender-Bares ...... A01C 7/00 |
| 9,754,416 B2 | 9/2017 | Kamhi et al. |
| 2011/0049263 A1* | 3/2011 | Vander Zaag ......... A01B 63/22 |
| | | 239/172 |
| 2012/0248227 A1* | 10/2012 | Peterson .................. B05B 1/14 |
| | | 239/565 |
| 2014/0180549 A1* | 6/2014 | Siemens ................ A01B 39/18 |
| | | 701/50 |
| 2015/0187109 A1 | 7/2015 | Mentzer |
| 2016/0113191 A1* | 4/2016 | Rosengren ............... A01C 7/06 |
| | | 701/50 |
| 2016/0307373 A1 | 10/2016 | Dean et al. |
| 2017/0372137 A1* | 12/2017 | Kumar ................. H04N 13/282 |
| 2018/0329024 A1* | 11/2018 | Send ....................... G01S 17/46 |

* cited by examiner

SYSTEM FOR TREATMENT OF AN AGRICULTURAL FIELD USING AN AUGMENTED REALITY VISUALIZATION

CROSS-REFERENCE TO RELATED APPLICATION(S)

This application claims priority to U.S. Provisional Patent Application No. 62/585,349, entitled "Augmented Reality for Plant Stand Management," filed Nov. 13, 2017, which is herein incorporated by reference.

FIELD OF THE INVENTION

This invention relates generally to the evaluation of plant stands, and in particular, to a device and method for processing high speed image input as an agricultural implement, such as a sprayer, traverses a field to provide augmented reality (AR) visualization for plant stands with comparison to a prescription map.

BACKGROUND OF THE INVENTION

Evaluating plant stands down to the individual plant level is an excessively burdensome and manual task. Heretofore, evaluating plant stands such as corn, have up until recently, required manual counting and visual characterization by an agronomist or trained practitioner. Recently, unmanned aerial vehicles have developed camera technologies and applications to count individual plants. However, these camera technologies and applications cannot characterize the maturity or placement accuracy of the plant stands in the field. Consequently, the evaluation of plant stands is conducted only on an infrequent basis, and even then, only with small subsamples within a given field.

SUMMARY OF THE INVENTION

The invention provides a system that provides simple and efficient automated evaluation of plant stands that opens up tremendous potential in terms of removal, fertilization, protection, and individual plant yield estimation. The system provides automated evaluation of size and placement of plants and may be incorporated into or mounted on a post-emergent vehicle such as a spray boom as a tool that greatly benefits farmers. A farmer could detect, measure, visualize, count, characterize, calculate, estimate, assess, track, and optimize the stand throughout the growing season and even through harvest. An augmented reality visualization of the plant stands can be compared to a prescription map to allow an operator of an implement to select changes in treatment of the field as the implement traverses the field. As a result, individual combine row yield monitors may not be needed for further development since the relative individual plant performance would already have been determined by the system and would be a known proportion of the yield at any instant on an aggregated monitor we use today.

Specifically then, one aspect of the present invention can provide a system for treatment of an agricultural field, including: a data structure containing a prescription map defining a treatment for the field; at least one camera operatively connected to an agricultural implement and being configured to take a series of images as the agricultural implement traverses the field; and a processor operatively connected to the data structure to receive the prescription map and the at least one camera to receive the series of images therefrom, the processor executing a program stored in non-transient medium to: generate an augmented reality visualization of the field from the series of images; and compare the augmented reality visualization to the prescription map as the agricultural implement traverses the field.

Another aspect of the present invention can provide an agricultural sprayer including: a frame supported by wheels; a sprayer boom supported by the frame; a series of spraying units supported by the sprayer boom; a tank supported by the frame, the tank feeding the spraying units; an operator cab supported by the frame; a display in the operator cab; an input in the operator cab for receiving a selection from an operator; at least one camera operatively connected to the sprayer and being configured to take a series of images as the agricultural implement traverses a field; a data structure containing a prescription map defining a treatment for the field; and a processor operatively connected to the data structure to receive the prescription map and the at least one camera to receive the series of images therefrom, the processor executing a program stored in non-transient medium to: generate an augmented reality visualization of the field from the series of images; display the augmented reality visualization to the display; and compare the augmented reality visualization to the prescription map as the agricultural implement traverses the field; receive a selection providing a change to the treatment.

Another aspect of the present invention can provide a method for treatment of an agricultural field, including: taking a series of images of plant stands as an agricultural implement traverses the field; generating an augmented reality visualization for the plant stands; referencing a data structure containing a prescription map defining a treatment for the field; and comparing the augmented reality visualization to the prescription map as the agricultural implement traverses the field.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

Figure 1:
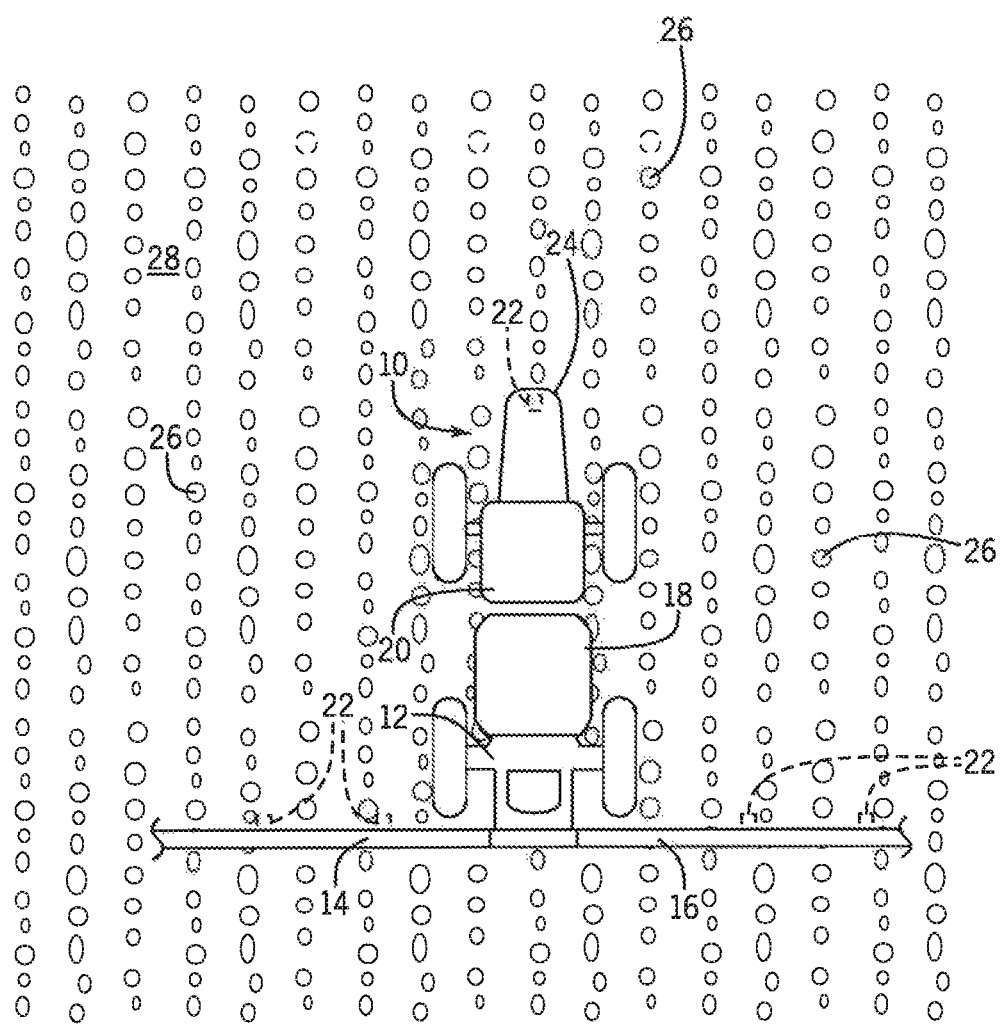
FIG. 1 is a schematic, top plan view of an agricultural implement, incorporating a device for processing high speed image input in accordance with present invention, traversing a field.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION OF THE DRAWINGS

An agricultural implement in accordance with the present invention is generally designated by the reference numeral 10. By way of example, agricultural implement 10 may take the form of an agricultural sprayer. However, while an agricultural sprayer is shown and described, it is understood that the present invention is not limited to an agricultural sprayer and thus may be applicable with other types of machines including, but not limited to other types of agricultural and machines that can travel through an agricultural field post-emergence and pre-harvest.

Agricultural implement 10 as-shown as a rear-boom sprayer and includes frame 12 having a rear-mounted boom with a pair of booms arms 14 and 16 connected to a boom center section that is supported by frame 12. As is conventional, boom arms 14 and 16 are designed to fold forward toward the leading end of the frame 12 when the boom is moved from an extended in-use position, shown in FIG. 1, to a stowed or transport position. Each boom arm 14 and 16 supports a series of spraying units (not shown) designed to deliver fluid from tank 18, centrally supported on frame 12, onto a farming or planting surface. As noted above, tank 18 is positioned generally in the center of the frame 12 between the boom arms 14 and 16 and an operator cab 20. One or more tanks 18 can be present to contain various fluids, such as herbicide, insecticide, and fertilizer, which is fed to the spraying units through a series of fluid lines (not shown) as known in the art. As also known in the art, operator cab 20 contains a control panel (not shown) that has various operator controls for controlling operation of the sprayer and its components.

Figure 2:
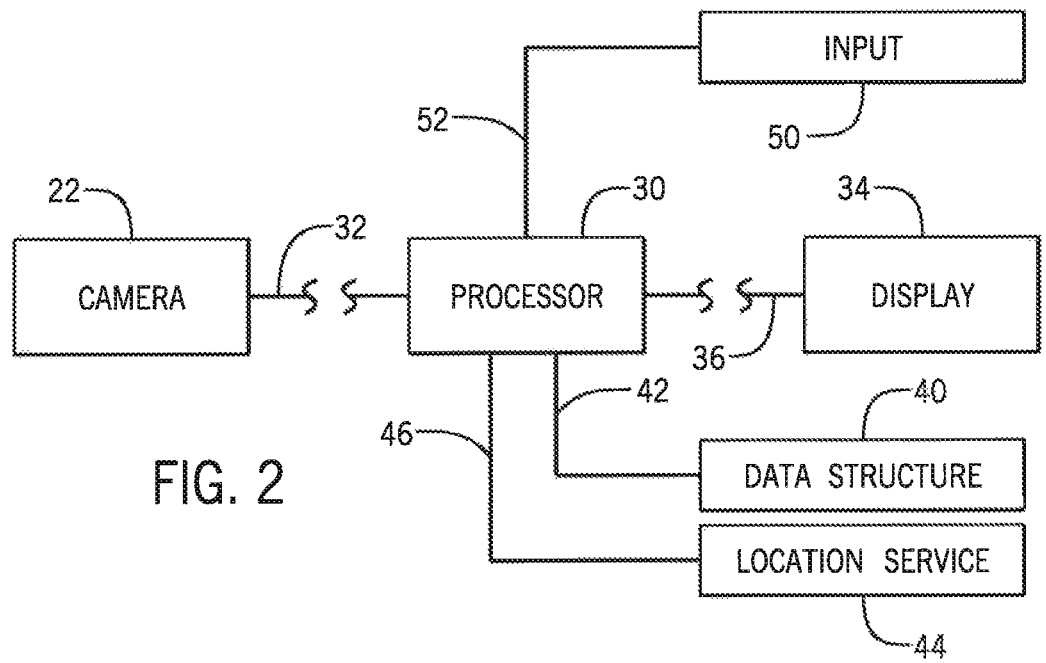
FIG. 2 is a schematic view of the device for processing high speed image input of the present invention.

It is contemplated to mount a high speed camera 22 at leading end 24 of agricultural implement 10. Additional high speed cameras 22 may be mounted to boom arms 14 and 16. It is intended for high speed cameras 22 to take a series of high resolution images of plant stands 26 as agricultural implement 10 traverses field 28. With additional reference to FIG. 2, high speed cameras 22 are operatively connected to processor 30 in any conventional manner such as by a hard wire, Bluetooth, or wifi connection, designated by line 32. Processor 30, in turn, is operatively connected to display 34 in any conventional manner such as by a hard wire, Bluetooth, or wifi connection, designated by line 36. In addition, processor 30 can be operatively connected to data structure 40, a non-transient data storage, in any conventional manner such as by a hard wire, Bluetooth, or wifi connection, designated by line 42. Data structure 40 can contain, among other things, a prescription map defining a treatment (or plan) for the field, such as precise locations for types of agricultural product to dispense at particular application rates, and an updateable program for execution by the processor 30 while conducting field operations. Also, processor 30 can be operatively connected to location service 44, which could comprise a Global Positioning System (GPS), in any conventional manner such as by a hard wire, Bluetooth, or wifi connection, designated by line 46. The location service 44 can be used by the processor to determine precise coordinate locations (latitude, longitude and/or elevation) of plants, such as the plant stands 26 in the field 28, and the implement 10. Also, processor 30 can be operatively connected to input 50, which could comprise a Human Machine Interface (HMI), switches, controls or other interface, in any conventional manner such as by a hard wire, Bluetooth, or wifi connection, designated by line 52. The input 50 can be used by the processor to receive selections from the operator with respect to treatment of the field, such as changing the agricultural product being dispensed, the application rate in which the agricultural product is dispensed, and/or the precise location in which the agricultural product is dispensed. The display 34 and the input 50 are preferably arranged in the operator cab 20 associated with the implement.

Figure 3:
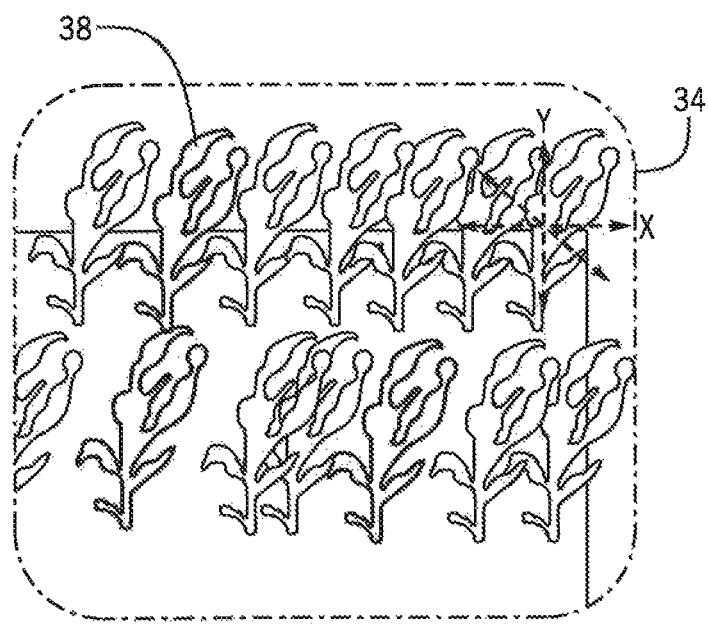
FIG. 3 is a depiction of an AR visualization for plant stands generated by the device for processing high speed image input of the present invention.

In operation, it is contemplated for agricultural implement 10 to traverse field 28 as a desired speed, e.g. 10 mph. At 10 mph, the agricultural implement will typically encounter 14 feet per row of crop in a single second, or approximately 30 plants. It is contemplated for high speed cameras 22 to deliver between 500-1800 image frames per second, which may be transmitted to processor 30 over line 32. With additional reference to FIG. 3, processor 30 converts the images received from high speed cameras 22 to AR stand maps, 38. AR stand maps 38 are displayed on display 34 for reference by a farmer or implement operator.

It is contemplated for processor 30 to utilize for the process to utilize the image frames received from high-speed cameras 22 in conjunction with morphological understanding of developing crops to characterize the stand. More specifically, it is contemplated for AR stand map 38 to display a plant's field position within a row, its morphological development (M), or its absence altogether (A). This could may be done via coloration from monochromatic green for an acceptable plant to a contrasting red for a plant out of place. Unacceptably under-developed plant may be colored blue and missing plants may be colored white. As such, it can be appreciated that the plant stands 26 may tracked in any number of ways for selected lethality via spraying, planter adjustment and machine optimization, targeted variation in side-dress rates, and individual plant yield estimates.

Farmers cannot interpret a green field without manually walking the stand, repeatedly throughout the growing season. Moreover, farmers cannot easily return to the same plant since no digital record of it exists that helps him track poorly placed or poorly performing plants, or missing plants, and what caused them and potential linkages to machinery. The device and methodology of the present invention allows for the simple and easy view of a field after the planter leaves the field. The device and methodology of the present invention allows for an estimate of the total canopy, green index, leaf area index, infrared reflectance, etc.

Figure 4:
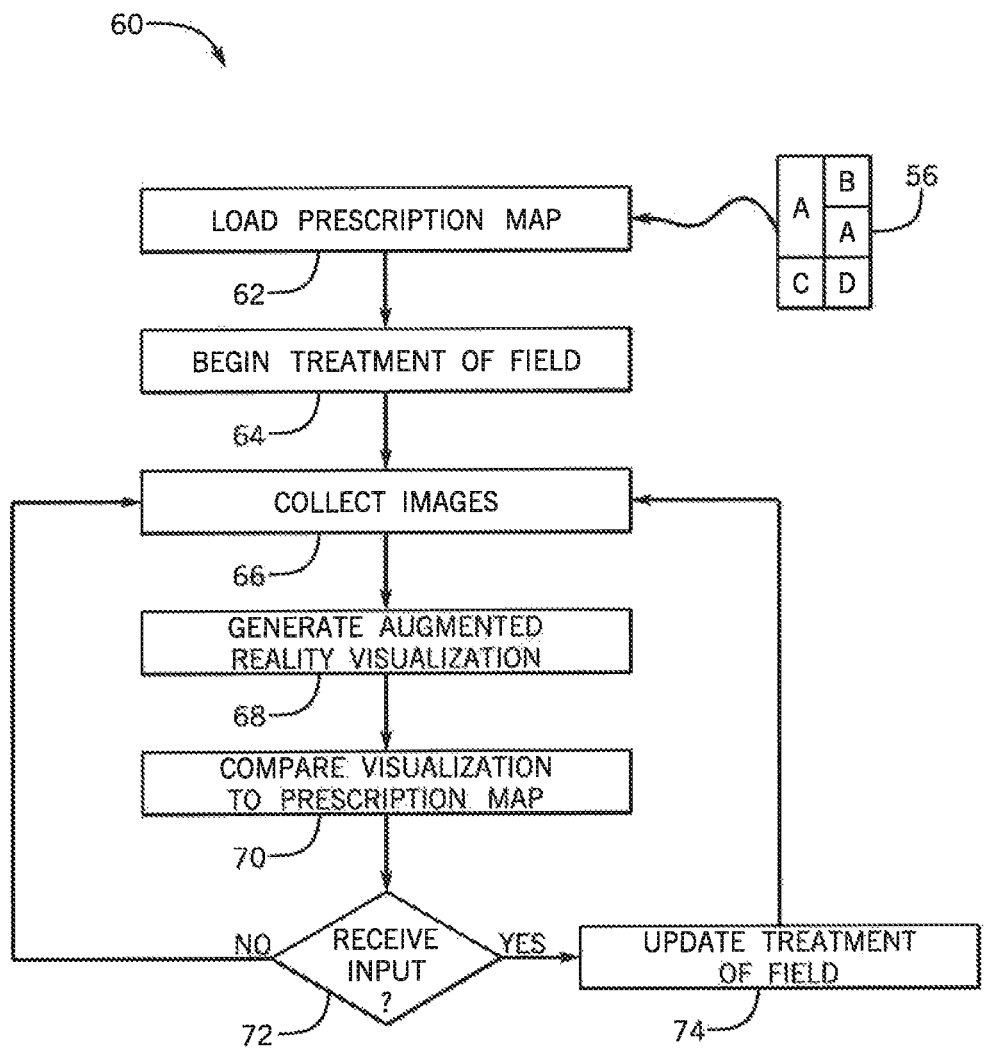
FIG. 4 is a flow chart illustrating operation of a system for treatment of an agricultural field in accordance with present invention.

Referring now to FIG. 4, in accordance with aspect of the invention, a process 60 illustrates exemplar operation of a system for treatment of an agricultural field. The process 60, which may be governed by the program in the data structure 40 and executed by the processor 30, can begin at step 62 in which a prescription map 56 is loaded by the system. The prescription map 56 can define a treatment (or plan) for the field, such as precise locations for types of agricultural product to dispense at particular application rates. Such locations could comprise, for example, individual plant stands and/or zones containing multiple plant stands. In one aspect, the prescription map 56 can include multiple zones in which at least one zone requires an agricultural product and/or application rate that is different from another zone. For example, the prescription map 56 might include multiple zone "A's" which require distribution of a liquid fertilizer at a first application rate, a zone "B" which requires distribution of the liquid fertilizer at a second application rate, a zone "C" which requires distribution of a different liquid fertilizer at a third application rate, and a zone "D" which requires distribution of the different liquid fertilizer at a fourth application rate.

Next, at step 64, treatment of the field can begin as the implement 10 traverses field 28 while the processor 30 executes to selectively control applications of agricultural products at selective locations and rates according to the prescription map 56. Then, at step 66, as the implement 10 traverses field 28, the system can collect a series of images from at least one of the cameras 22.

Next, at step 66, processor 30 can execute to generate an AR visualization of the field 28 from the series of images. The AR visualization can comprise AR stand maps 38 displayed on the display 34 for reference by the farmer or implement operator. Then, at step 70, processor 30 can execute to compare the AR visualization to the prescription map 56 as the implement 10 traverses field 28. In particular, the location service 44 can be used correlate precise coordinate locations (latitude, longitude and/or elevation) of plants, such as the plant stands 26 in the field 28, and the implement 10, to locations of the prescription map 56.

At decision step 72, processor 30 can determine whether a selection is received effecting treatment of the field 28. Such as a selection could comprise an input the operator through the input 50. The selection could be, for example, application of an agricultural product at different application rate to a plant, an area proximal to a plant, and/or zone of the prescription map, and/or application of a different agricultural product, such as a liquid fertilizer stored and/or a liquid herbicide stored in different tanks, to a plant, to an area proximal to a plant, and/or zone of the prescription map. Accordingly, the selection can provide a change to the treatment of the field 28. If a selection is received ("Yes"), processor 30 can update treatment of the field as indicated at step 74. Such an update can be temporary, such as a sudden spray of liquid herbicide to a plant stand as being identified in under-developed plant state, with treatment then returning to a predetermined, default condition; or permanent, such as changing an application rate, with such treatment maintained in such a manner until updated by another selection. The process can then return to step 66, where the process of collecting images, generating the AR visualization, comparing to the prescription map, and determining whether a selection is received, continues in a loop, while the implement 10 traverses field 28. However, if at decision step 72 a selection is not received ("No"), processor 30 can instead return to step 66, repeating the loop, without an update to any treatment of the field.

It can be appreciated that the above description is merely exemplary of the present invention. Various modes of carrying out the invention are contemplated as being within the scope of the following claims particularly pointing out and distinctly claiming the subject matter, which is regarded as the invention.

What is claimed is:

1. A system for treatment of an agricultural field, comprising:
    a data structure including a prescription map defining a treatment for the field;
    at least one camera operatively connected to an agricultural implement and being configured to take a series of images as the agricultural implement traverses the field; and
    a processor operatively connected to the data structure to receive the prescription map and the at least one camera to receive the series of images therefrom, the processor executing a program stored in non-transient medium to:
    generate an augmented reality visualization of the field from the series of images; and compare the augmented reality visualization to the prescription map as the agricultural implement traverses the field;
    wherein:
    the augmented reality visualization includes a position of a plant within the agricultural field and depicts a visualization of a morphological development of the plant using a plurality of colors; and
    each color of the plurality of colors corresponds to a different state of the plant.

2. The system of claim 1, wherein the treatment comprises application of an agricultural product at an application rate, and further comprising the processor executing to receive a selection of a different application rate.

3. The system of claim 2, wherein the prescription map comprises a plurality of zones, wherein at least one zone of the plurality of zones requires an application rate that is different from another zone of the plurality of zones, and wherein the selection of the different application rate is determined with respect to the at least one zone of the plurality of zones.

4. The system of claim 1, wherein the treatment comprises application of an agricultural product at an application rate, and further comprising the processor executing to receive a selection of a different agricultural product.

5. The system of claim 4, wherein agricultural products comprise a liquid fertilizer stored in a first tank and a liquid herbicide stored in a second tank.

6. The system of claim 1, further comprising a display in an operator cab associated with the agricultural implement, wherein the augmented reality visualization is displayed on the display.

7. The system of claim 6, wherein the plant is in a plant stand in the agricultural field and the augmented reality visualization depicts a visualization of the plant stand in the agricultural field.

8. The system of claim 7, further comprising a location service for obtaining a coordinate location with respect to each plant in the plant stand of the augmented reality visualization.

9. A system for treatment of an agricultural field, comprising:
    a data structure including a prescription map defining a treatment for the field;
    at least one camera operatively connected to an agricultural implement and being configured to take a series of images as the agricultural implement traverses the field; and
    a processor operatively connected to the data structure to receive the prescription map and the at least one camera to receive the series of images therefrom, the processor executing a program stored in non-transient medium to:
    generate an augmented reality visualization of the field from the series of images; and
    compare the augmented reality visualization to the prescription map as the agricultural implement traverses the field;

a display in an operator cab associated with the agricultural implement;

wherein:

the augmented reality visualization is displayed on the display;

the augmented reality visualization comprises plant stands in the field; and the augmented reality visualization is displayed using a plurality of colors, each color corresponding to a different state and the different states include at least three of:

determination of an acceptable plant;
determination of an out of place plant;
determination of under-developed plant; and
determination of a missing plant.

10. The system of claim 6, further comprising an input in the operator cab for receiving a selection from an operator, wherein the selection provides a change to the treatment.

11. An agricultural sprayer comprising:

a frame supported by a plurality of wheels;
a sprayer boom supported by the frame;
a series of spraying units supported by the sprayer boom;
a tank supported by the frame, the tank feeding the spraying units;
an operator cab supported by the frame;
a display in the operator cab;
an input in the operator cab for receiving a selection from an operator;
at least one camera operatively connected to the sprayer and being configured to take a series of images as the agricultural implement traverses a field;
a data structure including a prescription map defining a treatment for the field; and
a processor operatively connected to the data structure to receive the prescription map and the at least one camera to receive the series of images therefrom, the processor executing a program stored in non-transient medium to:
generate an augmented reality visualization of the field from the series of images;
display the augmented reality visualization to the display;
compare the augmented reality visualization to the prescription map as the agricultural implement traverses the field; and
receive a selection providing a change to the treatment;

wherein:

the augmented reality visualization includes a position of a plant within the agricultural field and depicts a visualization of a morphological development of the plant using a plurality of colors; and
each color of the plurality of colors corresponds to a different state of the plant.

12. The sprayer of claim 11, wherein the treatment comprises application of an agricultural product at an application rate, and wherein the selection provides a change in the application rate.

13. The sprayer of claim 12, wherein the prescription map comprises a plurality of zones, wherein at least one zone of the plurality of zones requires an application rate that is different from another zone of the plurality of zones, and wherein the selection provides a change in the application rate with respect to the at least one zone of the plurality of zones.

14. The sprayer of claim 11, wherein the treatment comprises application of an agricultural product at an application rate, and wherein the selection provides a change in the agricultural product.

15. The sprayer of claim 14, wherein the tank is a first tank, and further comprising a second tank, wherein the change in the agricultural product comprises changing from application of a liquid fertilizer stored in the first tank to application of a liquid herbicide stored in the second tank.

16. A method for treatment of an agricultural field, comprising:

taking a series of images of plant stands as an agricultural implement traverses the field;
generating an augmented reality visualization for the plant stands, the augmented reality visualization including a position of each plant of the plant stands and a morphological development of each plant using a plurality of colors, wherein each color of the plurality of colors corresponds to a different state of a corresponding plant;
referencing a data structure including a prescription map defining a treatment for the field; and
comparing the augmented reality visualization to the prescription map as the agricultural implement traverses the field.

17. The method of claim 16, wherein the treatment comprises application of an agricultural product at an application rate, and further comprising the step of receiving a selection of a different application rate.

18. The method of claim 17, wherein the prescription map comprises a plurality of zones, wherein at least one zone of the plurality of zones requires an application rate that is different from another zone of the plurality of zones, and further comprising the selection of the different application rate being determined with respect to the at least one zone of the plurality of zones.

19. The method of claim 16, wherein the treatment comprises application of an agricultural product at an application rate, and further comprising the step of receiving a selection of a different agricultural product.

20. The method of claim 19, wherein the agricultural products comprise a liquid fertilizer and a liquid herbicide.

* * * * *